UNITED STATES PATENT OFFICE.

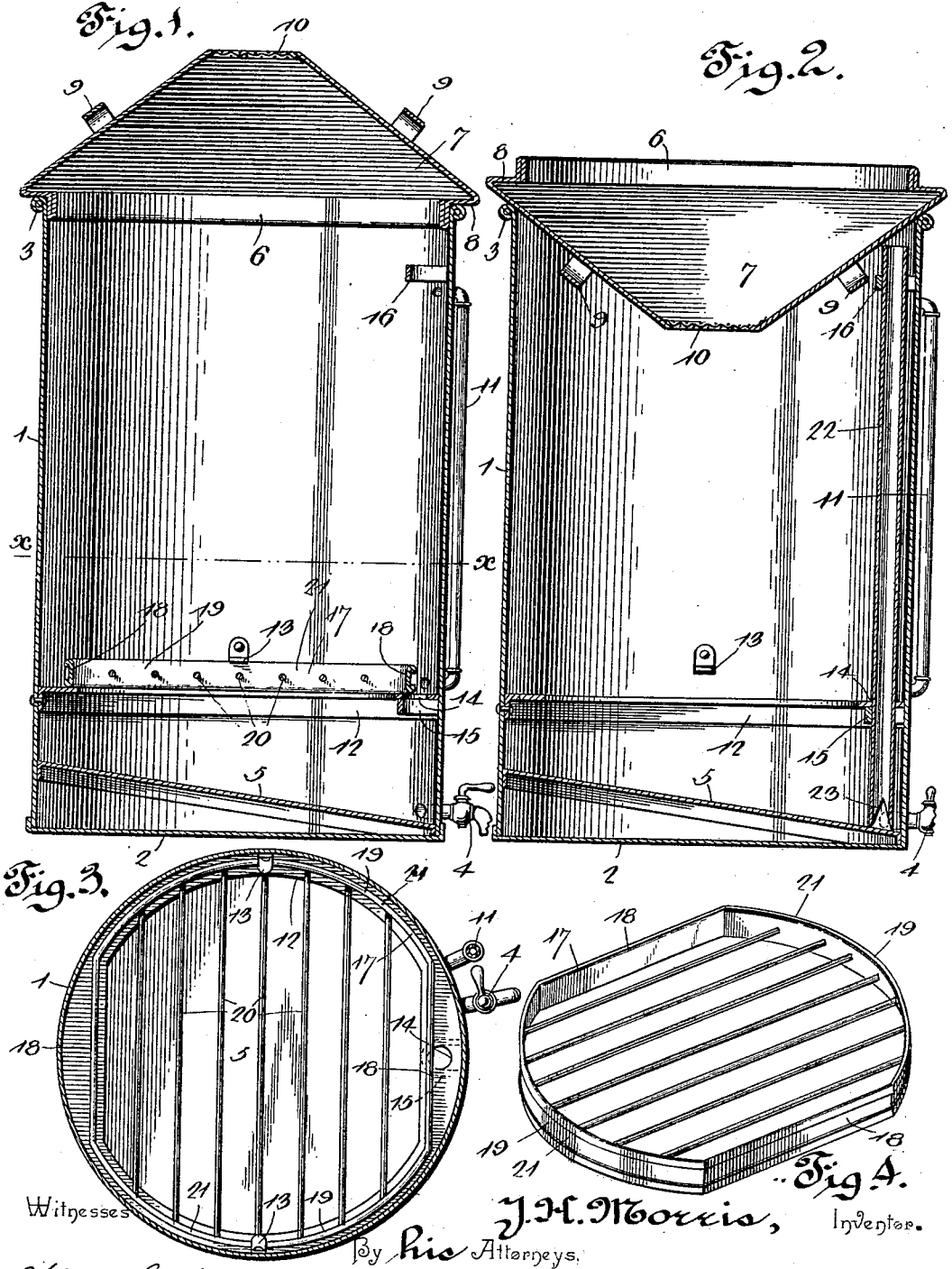

JOHN H. MORRIS, OF MAQUOKETA, IOWA.

CREAM-SEPARATOR.

SPECIFICATION forming part of Letters Patent No. 631,875, dated August 29, 1899.

Application filed June 24, 1899. Serial No. 721,780. (No model.)

*To all whom it may concern:*

Be it known that I, JOHN H. MORRIS, a citizen of the United States, residing at Maquoketa, in the county of Jackson and State of Iowa, have invented a new and useful Cream-Separator, of which the following is a specification.

This invention relates to cream-separators, and is designed more particularly for domestic use, although it may be used in creameries and other manufacturing establishments.

The object of the invention is to produce a separator adapted for use either with ice or water of low temperature and to provide means for holding the ice down toward the bottom of the receptacle and prevent it from floating or rising and also to introduce water at the lower portion of the milk, whereby the cream may be effectually separated from the milk.

The invention consists, essentially, of a can or body having a lid or cover, a ventilating-opening therein, over which is extended a screen, adapting the said lid or cover for use as a strainer when inverted, the lower portion of the body of the receptacle or can having a supporting-ledge and maintaining devices to receive a grate for the purpose of holding ice upon an inclined bottom below and also to arrange thimbles or tubular brackets at varying elevations within the receptacle or can to receive a removable tube, whereby the one apparatus may be quickly changed or reorganized for the introduction of either ice or water as a separating medium.

The invention further consists in the details of construction and arrangement of the different parts, which will be hereinafter more fully described and claimed.

In the accompanying drawings, Figure 1 is a transverse vertical section of the improved device, showing the lid or cover in normal position and an ice-holding grate removably situated within the lower part of the same above an inclined bottom. Fig. 2 is a view similar to Fig. 1, illustrating the lid or cover inverted and arranged for use as a strainer and a water-feeding tube substituted for the grate. Fig. 3 is a horizontal section on the line *x x* of Fig. 1. Fig. 4 is a detail perspective view of the grate.

Similar numerals of reference are employed to indicate corresponding parts in the several views.

The numeral 1 represents a receptacle or can, which may be of any suitable dimension and having a main bottom 2 and an upper rolled edge 3. A drain cock or faucet 4 is attached to the receptacle or can near the bottom 2 and at such a point as to conjunctively act with an inclined supplemental bottom 5, which slopes toward the tap-opening of the side cock.

The upper rolled edge 3 of the receptacle or can is adapted to receive a flange 6 of a conical lid or cover 7, having a circumferential shoulder 8 to rest upon the said upper edge of the receptacle or can and also provided with opposite grips 9 for obvious purposes. The lid or cover 7 at its apex is cut off to form an opening, which has a reticulated or screen covering 10 to form a strainer, the said opening also providing ventilating means for the receptacle or can to permit the escape of the animal heat from the milk during the process of separation. When the lid or cover 7 is used as a strainer, it is inverted and projected into the upper portion of the receptacle or can, as shown by Fig. 2, and during the process of separation said lid or cover is disposed as shown by Fig. 1.

Along the exterior of the receptacle or can a gage 11 extends and is of such length as to indicate the level of the milk at the line of separation.

At a short distance above the inclined bottom 5 a ledge 12 is fixed within the receptacle or can, and above the ledge at diametrically opposite points and in operative relation are angular lugs or keepers 13. Through one portion of the ledge an opening 14 is formed, and immediately below is a supporting-thimble or tubular bracket 15, and above the opening 14 and thimble or bracket 15 and in vertical alinement therewith is a thimble or tubular bracket 16.

The ledge 12 and lugs 13 and the thimbles or brackets 15 and 16 are intended for use with separate devices adapted to hold and supply refrigerating mediums of low temperature under different conditions. As shown by Fig. 1, a grate 17, having opposite flat sides 18, is used with the ledge 12 and the lugs 13. This grate consists of a surrounding rim 19, constructed in any preferred manner and having cross bars or rods 20. The opposite flat sides 18 of the grate provide for the easy insertion of the same within the receptacle or can 1 and also to afford means for easily positioning said grate on the ledge 12. When the grate is brought toward the ledge, the flat sides 18 are disposed opposite or adjacent the lugs 13, thus clearing the latter, and after the said grate has bearing on the ledge it is turned until the opposite curved end portions 21 are under the said lugs. By this means the grate is held firmly to the ledge, and the width of the rim 19 is such that it will have a slight frictional binding between the ledge and the lugs when the said curved end portions 21 of the plate are in the position shown by Fig. 3. As shown by Fig. 2, a tube 22 is movably held by the thimbles or tubular brackets 15 and 16. To apply this tube, the lower end is first inserted through the upper thimble or bracket 16 and then downwardly through the opening 14 in the ledge and the lower thimble or bracket 15. When this tube is used, it is intended that the grate be disconnected and withdrawn from the receptacle or can 1, and the lower end of said tube, which is slotted, as at 23, to facilitate the feed of the water therethrough, rests upon the inclined supplemental bottom 5 at its lowest level. The upper end of the tube stands a suitable distance above the thimble or bracket 16 and is clearly open to receive a funnel or analogous device for pouring water of a low temperature into the tube.

When the grate 17 is used, ice is first placed in quantity upon the supplemental bottom 5. The grate is then mounted thereover on the ledge 12 and the milk is poured into the top of the can or receptacle 1. As will be readily understood, the ice or low temperature set up thereby at the bottom of the can or receptacle causes particles of cream to rise while the blue milk is assimilated, the cream floating on top. The milk is allowed to stand in this position for a few moments, and the blue milk is then drawn off through the cock 4, leaving the cream in the can, from which it may be afterward removed in any suitable manner.

In the use of the tube 22 it is arranged as shown in Fig. 2 and the milk poured into the can or receptacle 1. Water of low temperature is then introduced into the said tube and flows down to the bottom 5, and the water being cold immediately settles to the bottom, and as it is distributed regularly it rises and carries the particles of cream upwardly therewith, while the blue milk, as before indicated, is assimilated and the cream held in suspension on top. In this operation the milk is allowed to stand for a short time to obtain a thorough separation, and the water and blue milk are then drawn off through the draincock 4. In relieving the receptacle or can 1 of the refuse milk and water the inclined bottom 5 facilitates a thorough drainage, as it directs the flow toward the tap-opening of the drain cock or faucet.

At times, if desired, the ice or other cooling medium might be contained within a receptacle or receptacles, and those rest on the bottom 5. It is preferred, however, that the devices particularly described be employed, as it is found by their use in conjunction with the refrigerating mediums for which they are particularly adapted that the cream can be separated from the milk very rapidly.

The interior arrangement of the receptacle or can 1 does not obstruct to any material degree the cleansing operations necessary in this class of devices. The removability of the grate 17 and the tube 22 affords means for easily cleaning and purifying such devices and also more readily gives access to all parts of the interior of the receptacle or can, and to suit different applications changes in the proportions, size, and minor details of construction can be resorted to without departing from the spirit of the invention or sacrificing any advantages incident thereto.

Having thus described the invention, what is claimed as new is—

1. In a cream-separator, the combination with a receptacle or can, of an annular ledge, angular lugs arranged above the ledge at opposite points, one portion of the ledge having an opening therethrough aside from the central opening thereof, a thimble or tubular bracket under the part of the ledge having the opening therein, a similar upper thimble or bracket in alinement with the lower one, a grate adapted to be rested upon said ledge and be held by said lugs, said grate being smaller in cross-sectional extent in one direction, and a tube adapted to be removably inserted in the thimbles or brackets when the grate is removed, whereby the separator is made readily adaptable for use with cooling mediums in different conditions.

2. In a cream-separator, the combination of a receptacle or can, having a main bottom and an inclined supplemental bottom above the same, an annular ledge above the said supplemental bottom adapted to support a grate and having an opening through one portion thereof aside from the central opening thereof, angular lugs at opposite points on the interior of the receptacle above the ledge, an interior thimble or tubular bracket directly under the said opening through one portion of the ledge, an upper interior thimble or bracket in alinement with the lower similar device and the opening in one portion of the ledge, a tube adapted to be removably mounted in the said thimbles or brackets and have its lower end rested on the lowest level of the said supplemental bottom, the said tube also passing through the opening in the ledge, and a conical lid or cover for the receptacle or can, having a strainer therein.

In testimony that I claim the foregoing as my own I have hereto affixed my signature in the presence of two witnesses.

JOHN H. MORRIS.

Witnesses:
ADAM RINGLEP,
JOHN G. TUBBS.